US005621219A

United States Patent [19]

van Renesse et al.

[11] Patent Number: 5,621,219

[45] Date of Patent: Apr. 15, 1997

[54] DEVICE FOR SCANNING THE GEOMETRICAL PATTERN OF A MARK OF AN OBJECT

[75] Inventors: Rudolf L. van Renesse, Den Haag; Teunis Tel, Groningen; Bart Snijders, Schiebroek, all of Netherlands

[73] Assignee: Unicate B.V., KE Groningen, Netherlands

[21] Appl. No.: 439,251

[22] Filed: May 11, 1995

[30] Foreign Application Priority Data

May 11, 1994 [NL] Netherlands .......................... 9400782

[51] Int. Cl.[6] .................................................. G01N 21/86

[52] U.S. Cl. ................................ 250/559.44; 250/208.1; 283/83

[58] Field of Search ............................ 356/71, 400, 401, 356/385; 250/208.1, 208.2, 559.44, 548, 559.12–559.15; 382/135, 111, 321; 283/113, 83, 98, 103; 235/487–495

[56] References Cited

U.S. PATENT DOCUMENTS 3,313,941 4/1967 Marks .
3,643,216 2/1972 Greenaway .
4,138,057 2/1979 Atalla ..................................... 235/380
4,143,810 3/1979 Greenaway ............................ 235/487
4,250,217 2/1981 Greenaway ............................ 428/161
4,582,986 4/1986 Stockburger et al. .
4,682,794 7/1987 Margolin .
4,710,627 12/1987 Baltes et al. .
4,757,188 7/1988 Nakarai et al. ........................ 235/454
4,837,425 6/1989 Edwards ................................ 235/457
4,887,155 12/1989 Massen ................................. 358/107
5,018,830 5/1991 Krop ...................................... 350/105
5,089,712 2/1992 Holland .
5,453,097 9/1995 Tel .......................................... 283/72
5,483,602 1/1996 Stenzel et al. ......................... 382/135

FOREIGN PATENT DOCUMENTS 0054071 6/1982 European Pat. Off. .
0064102 11/1982 European Pat. Off. .
0384274 8/1990 European Pat. Off. .
2631403 1/1978 Germany .
0106832 4/1983 United Kingdom .
8201778 5/1982 WIPO .
9119614 12/1991 WIPO .
9201975 2/1992 WIPO .

*Primary Examiner*—Stephone Allen
*Attorney, Agent, or Firm*—Michael D. Bednarek; Kilpatrick & Cody, L.L.P.

[57] ABSTRACT

A device for determining from one or more different directions the geometrical pattern of a mark being randomly shaped in three dimensions and being embedded in a transparent material and securely fixed to an object. A radiation source is designed to emit radiation to a matrix of radiation detectors. The object is placed with the mark in the path of the radiation for projecting a silhouette of the mark onto the matrix of radiation detectors by the radiation sources.

18 Claims, 2 Drawing Sheets

DEVICE FOR SCANNING THE GEOMETRICAL PATTERN OF A MARK OF AN OBJECT

BACKGROUND OF THE INVENTION

This invention relates to a device for determining from one or more different directions the geometrical pattern of a mark being randomly shaped in three dimensions and being embedded in a transparent material and securely fixed to an object.

DISCUSSION OF THE PRIOR ART

From International Patent Application WO-A-91/19614 it is known to provide objects or articles for security purposes with a unique mark in the form of a number of randomly overlying fibres. Such fibres are of any desired material, such as a plastic, a metal or the like, and they are embedded in a material which is transparent to a specific radiation used, such as plastic, glass or the like, and are securely fixed to the object, such as a document, a banknote, a card or a passport, or also a work of art, a car or any other valuable item. The object is completely individualized by the fibre pattern, with the result that the presence of a particular fibre pattern can be used effectively for protecting the object from forgery or imitation, and for preventing theft of the object. For this purpose, the pattern formed by the individual fibres is optically scanned in order to determine geometrical configurations of the fibres. Such scanning can be carried out by examining the essentially three-dimensional fibre pattern from one direction, but it is also possible to scan the fibre pattern from several directions, thus obtaining a combination of a number of more or less different patterns still belonging together, which gives a higher degree of security. Instead of a fibre pattern, also other marks with an essentially three-dimensional random shape may be used to protect an object from forgery or imitation, such as grains of sand, one or more crystals, etc.

The above-described randomly shaped three-dimensional mark can be placed very simply and at very low cost on or in an object, and is therefore particularly suitable for use on a large scale, such as for the protection of banknotes, passports and credit cards or similar cards for widely varying applications. It goes without saying that for large-scale applications consequently equipment is needed on a large scale for scanning the mark. No equipment has been available until now to allow this need to be met economically.

SUMMARY OF THE INVENTION

The object of the invention is to be able to produce a device of the type mentioned in the preamble simply and cheaply, so that a sturdy and reliable unit of limited dimensions is obtained.

This object is attained according to the invention in that it provides a device comprising at least one radiation source which is designed to emit radiation to a matrix of radiation detectors, provision being made for means for placing the object with the mark in the path of the radiation, a silhouette of the mark being projected onto the matrix of radiation detectors by the or each radiation source. In this case both geometrical blurring and deflection blurring of the silhouette generally occur. However, such types of blurring are simple to correct by means of suitable processing of the image information obtained by means of the radiation detectors, with the result that a very useful projection of the mark can be picked up with the device according to the invention. The image information thus obtained is processed further by computing means for the purpose of obtaining one or more security features to be derived from the mark. The method and device for processing the image information can be selected by the skilled person to suit his needs and therefore form no part of the present invention.

The matrix of radiation detectors generally is a regular arrangement having a plurality of lines and columns of evenly spaced detectors. However, other arrangements, e.g. circular arrangements, of detectors are also feasible.

The means for placing the object with the mark in the path of the radiation are well known in the art—e.g. for handling credit cards in banking machines—and will therefore not be described in more detail.

It should be pointed out that U.S. Pat. No. 4,682,794 and European Patent Application EP-A-0,384,274 disclose devices for reading a code placed in a card by means of optical fibres. The optical fibres run in a random manner from a random first point on the side edge of the card to a random second point on the side edge of the card. A light spot pattern which is characteristic of the specific card is produced on the side edge of the card at the fibre output sides by transmitting radiation into the optical fibres from the side of the card. In these devices the geometrical configurations defined by the individual fibres play no role whatsoever.

It should also be pointed out that European Patent Specification EP-B-0,054,071 discloses a device in which the translucency of an area of a sheet of material, such as a sheet of paper, in which fibres may be present, is determined. It is a question of measuring an average translucency over an area containing a large number of fibres; the geometrical configurations defined by the individual fibres play no role whatsoever.

The device preferably comprises at least two radiation sources, which are designed to emit radiation from different directions to the matrix of radiation detectors. In such an arrangement advantage is taken of the fact that the mark is three-dimensional, the silhouettes of the same mark from different positions producing different geometrical configurations on the matrix of radiation detectors. The combination of the different geometrical configurations is completely characteristic of the mark, which is therefore impossible to forge. If it is ensured that the wavelengths of the radiation emitted by the radiation sources differ from each other, various silhouettes can be picked up simultaneously and can be distinguished from one another easily by means of suitable image processing techniques, with the result that the scanning of the mark can be carried out quickly from different directions.

In a preferred embodiment the device according to the invention comprises means for changing the position of the radiation source relative to the radiation detectors. The radiation source can thus be placed in, for example, two different positions, in each of which the silhouette of the mark on the matrix of radiation detectors is determined.

In another preferred embodiment the device according to the invention comprises one or more mirrors or prisms for reflecting the radiation coming from the radiation source via the mark to the radiation detectors. These mirrors or prisms can be used for directing the radiation, thus giving more freedom as regards the shape of the device. The mirrors or prisms can also be used for making one radiation source produce several radiation beams.

The radiation source is preferably designed to emit radiation with a wavelength in the near infrared. A good separation of the radiation emitted by the radiation source(s) and the diffuse light from outside the device can be achieved in this way, for example by using a spectral separating filter for the radiation detectors, or by making the object itself hold back the diffuse light. This measure also makes it possible to incorporate the mark in a transparent material which may be transparent to radiation in the near infrared, but which absorbs visible light. This means that the mark can be concealed in an object. The wavelength of the radiation is expediently 800–1000 nm, and preferably 950 nm.

A particularly suitable radiation source is a radiation-emitting diode (Light Emitting Diode (LED); Infrared Emitting Diode (IED)). Such a radiation source is small, simple and cheap.

The distance between the mark and the radiation detectors is preferably less than 3 mm, and in particular less than 1 mm. This means that a sufficiently sharp silhouette of even very fine details, for example with transverse dimensions of the order of 0.04 mm, can be expected on the radiation detectors, bearing in mind the geometrical blurring and deflection blurring which occurs.

It has emerged from experiments that in an optimum configuration the distance between the radiation source and the mark is at least approximately equal to the distance between the mark and the radiation detectors. In this way an enlargement of the silhouette to dimensions which are considerably greater than those of the original mark is avoided, with the result that the sensitivity of the device to both the distance of the object from the radiation detectors and the distance of the radiation source from the radiation detectors can be made very low.

In a simple, sturdy and cheap embodiment the radiation detectors form part of a CCD (charge-coupled device).

A particularly compact design of the device according to the invention can be obtained if said device is provided with a radiation conductor of a solid material for conducting the radiation from the radiation source to the position of the mark, and/or a radiation conductor of a solid material for conducting the radiation from the position of the mark to the radiation detectors.

In an advantageous embodiment the device is used to scan a mark consisting of a number of randomly overlying fibres.

The claims and many of the attendant advantages will be more readily appreciated as the same becomes better understood by reference to the following detailed description and considered in connection with the accompanying drawings in which like reference symbols designate like parts or parts with a similar function.

DESCRIPTION OF THE PREFERRED EMBODIMENTS

Although in the following the mark is defined as consisting of a pattern of fibres, it should be understood that other marks having an essentially random three-dimensional shape may also be employed to protect an object against forgery. All such marks can be scanned with the device according to the invention.

Figure 1:
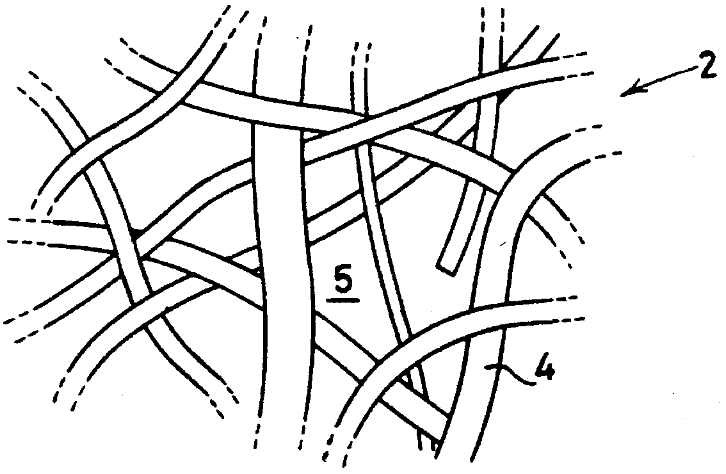
FIG. 1 shows the geometry of a mark consisting of a pattern of a number of randomly overlying individual fibres on a greatly enlarged scale.

FIG. 1 shows a pattern 2 of fibres 4 lying randomly over one another. The fibres 4 can be of different materials from each other, and the transverse dimensions of the fibres 4 can also differ from each other. The fibres 4 define a number of different fixed geometrical configurations through the fact that they are incorporated in a transparent base material 5 which encloses and supports the fibres. The fibres 4 are visible from a surface of the carrier material 5, and can be detected optically from said surface through the transparent material 5, in order to determine the geometrical configurations of the fibres 4. In a particular application the fibres can have transverse dimensions of 0.04 mm and are made of, for example, a polyester core with a polyamide coating. The fibres 4 can form part of a nonwoven.

Figure 2:
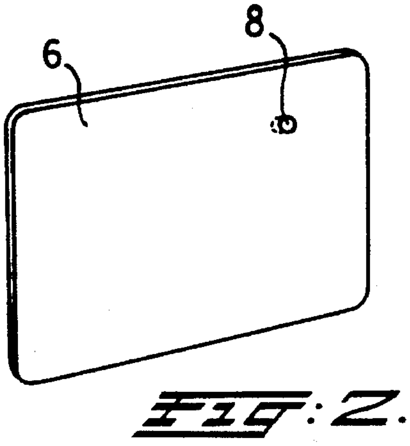
FIG. 2 shows a card with a fibre pattern.

FIG. 2 shows a card 6, for example a credit card, an admission pass or the like, which is provided with a fibre pattern in a window 8. The window 8 is filled with transparent material 5 in which the fibres 4 are embedded. The fibre pattern 2 can be detected both from the front and from the back of the card 6 by placing a light source at the opposite side of the card 6.

Figure 3:
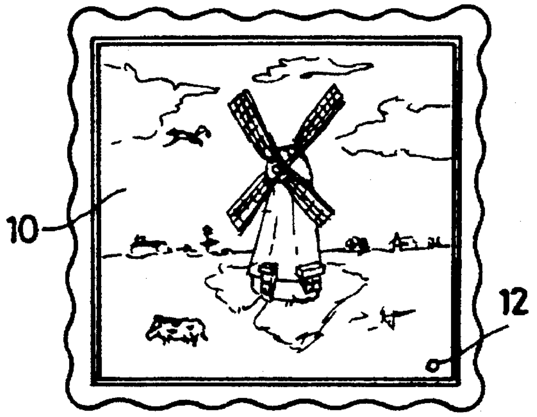
FIG. 3 shows a painting with a fibre pattern.

FIG. 3 shows a painting 10, in which a fibre pattern 2 is provided near a corner in a recess 12. The fibre pattern 2 in the painting 10 can be detected only from the side shown in the figure, for which purpose a background which contrasts with the fibres 4 is provided behind the fibre pattern.

Figure 4:
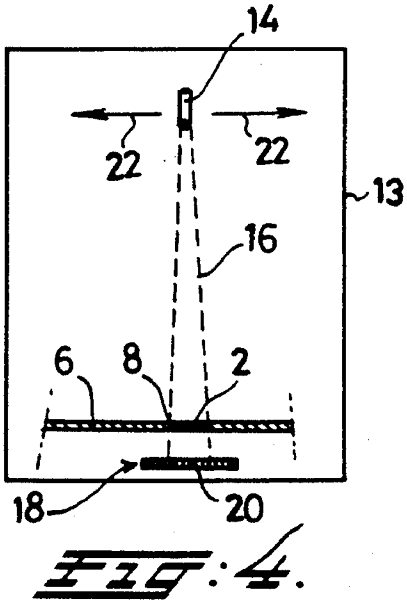
FIG. 4 shows diagrammatically in side view a device according to the invention for scanning the fibre pattern of the card according to FIG. 2.

FIG. 4 shows a part of the side of the card 6 of FIG. 2 on an enlarged scale. The device, which comprises a housing 13 in which the card 6 is placed, comprises a radiation source 14, such as an LED, which can project a beam 16 of uniform radiation onto a matrix 18 of radiation detectors 20. The card 6 is placed in such a way between the radiation source 14 and the radiation detector matrix 18 that the radiation beam is directed at the fibre pattern 2 in the window 8 of the card, with the result that a silhouette of the fibre pattern is produced on the radiation detector matrix 18 and can be read. If desired, different silhouettes of the three-dimensional fibre pattern 2 can be projected onto the radiation detector matrix 18 by moving the radiation source in the direction of one of the arrows 22. The distance between the radiation source 14 and the fibre pattern 2 is, for example, approximately 80 mm, while the distance between the fibre pattern 2 and the radiation detector matrix 18 is, for example, approximately 1 mm, with an average fibre transverse dimension of 0.04 mm and a fibre pattern surface area of the order of 1 $mm^2$.

Figure 5:
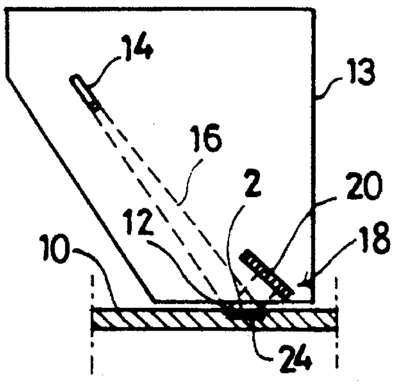
FIG. 5 shows diagrammatically in side view and partially in cross-section a device according to the invention for scanning the fibre pattern of the painting according to FIG. 3.

FIG. 5 shows on an enlarged scale a part of the cross-section of the painting 10 at the position of the recess 12 with the fibre pattern 2. The radiation source 14 projects a radiation beam 16 onto the fibre pattern 2, which radiation is reflected behind the fibre pattern onto a reflecting surface 24 and is intercepted on the radiation detector matrix 18. Through parallax phenomena, in the case of a reflecting surface 24 two silhouettes of the fibre pattern 2 which are staggered relative to each other will appear on the radiation detector matrix 18.

Figure 6:
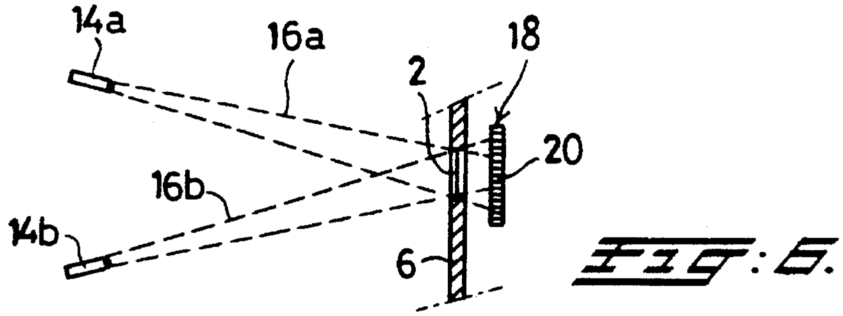
FIG. 6 shows diagrammatically in side view and partially in cross-section another embodiment of the device according to the invention.

FIG. 6 illustrates the construction of a device similar to that according to FIG. 4, however, in FIG. 6 two radiation sources 14*a* and 14*b* are used. The silhouettes of the fibre pattern 2 obtained on the radiation detector matrix 18 by means of the radiation beams 16*a* and 16*b* coming from the radiation sources 14*a* and 14*b* respectively can be picked up either in succession or simultaneously. If picked up simultaneously, a suitable image processing operation handles the separation of the two silhouettes from each other. It is also possible to make the radiation sources 14*a* and 14*b* each emit radiation of a different wavelength, with the result that the separation of the silhouettes is simplified, when the radiation detectors are suitable to distinguish between the radiations with different wavelengths.

Figure 7:
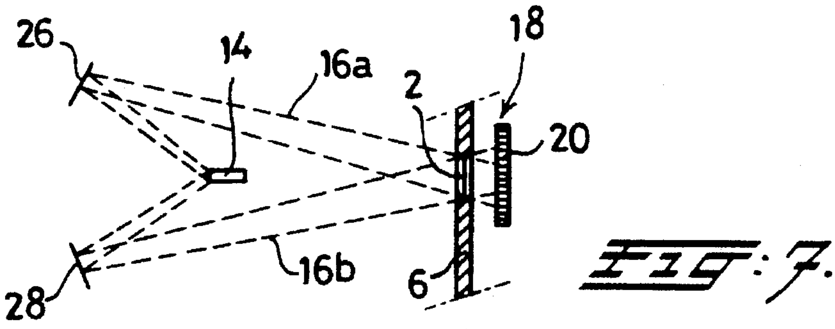
FIG. 7 shows diagrammatically in side view and partially in cross-section yet another embodiment of the device according to the invention.

In FIG. 7 use is made of a single radiation source 14, the radiation of which is directed at two mirrors or prisms 26 and 28 set up at different places. In this way, as in FIG. 6, two radiation beams 16*a* and 16*b* directed at the fibre pattern 2 are obtained.

Figure 8:
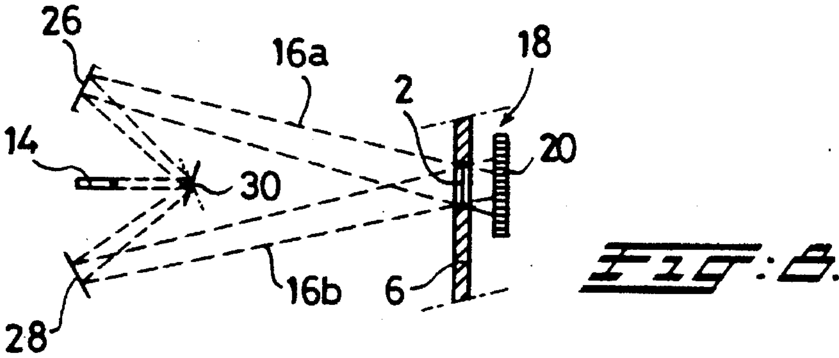
FIG. 8 shows diagrammatically in side view and partially in cross-section again another embodiment of the device according to the invention.

In the embodiment according to FIG. 8 the radiation beams 16*a* and 16*b* are obtained by directing the radiation beam coming from the radiation source 14 at a mirror 30 which can be tilted out of the position shown into the position indicated by a dotted line, with the result that the radiation beam coming from the radiation source 14 can be directed alternately at the mirror 26 and the mirror 28.

Figure 9:
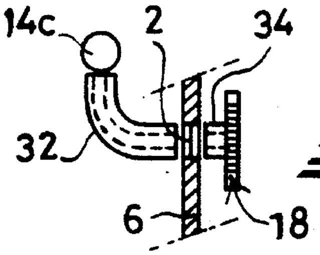
FIG. 9 shows diagrammatically in side view and partially in cross-section an alternative embodiment of the device according to the invention.

It will be clear that, as FIG. 9 illustrates, the radiation coming from a radiation source 14*c* can be transmitted also by means of solid-state radiation conductors 32 and 34, such as optical fibres, to the position where the fibre pattern 2 is located and from the position where the fibre pattern 2 is located to the radiation detector matrix 18.

While the invention has been described and illustrated in its preferred embodiments, it should be understood that departures may be made therefrom within the scope of the invention, which is not limited to the details disclosed herein.

What is claimed is:

1. A device for determining from two or more different directions the geometrical pattern of a mark being randomly shaped in three dimensions and being embedded in a transparent material and securely fixed to an object, comprising; a matrix of radiation detectors;

at least one radiation source which is designed for emitting radiation to the matrix of radiation detectors;

means for placing the object with the mark in the path of the radiation so that a silhouette of the mark is projected onto the matrix of radiation detectors by the or each radiation source.

2. A device according to claim 1, comprising at least two radiation sources, the two radiation sources emitting radiation from different directions to the matrix of radiation detectors.

3. A device according to claim 2, wherein the wavelengths of the radiation emitted by the radiation sources differ from each other.

4. A device according to claim 1, comprising means for changing the position of the radiation source relative to the radiation detectors.

5. A device according to claim 1, comprising at least one mirror or prism for reflecting the radiation coming from the radiation source via the mark to the radiation detectors.

6. A device according to claim 1, wherein the radiation source emits radiation with a wavelength in the near infrared.

7. A device according to claim 6, wherein the wavelength of the radiation is 800–1000 nm.

8. A device according to claim 1, wherein the radiation source is a radiation-emitting diode.

9. A device according to claim 1, wherein the distance between the mark and the radiation detectors is less than 3 mm.

10. A device according to claim 1, wherein the distance between the radiation source and the mark is at least equal to the distance between the mark and the radiation detectors.

11. A device according to claim 1, wherein the radiation detectors form part of a charge-coupled device (CCD).

12. A device according to claim 1, comprising a radiation conductor of a solid material for conducting the radiation from the radiation source to the position of the mark.

13. A device according to claim 1, comprising a radiation conductor of a solid material for conducting the radiation from the position of the mark to the radiation detectors.

14. A device according to claim 1 wherein the mark consists of a number of randomly overlying fibres.

15. A device according to claim 6, wherein the wavelength of the radiation is 950 nm.

16. A device according to claim 1, wherein the distance between the mark and the radiation detectors is less than 1 mm.

17. A device according to claim 1, wherein the distance between the radiation source and the mark is approximately equal to the distance between the mark and the radiation detectors.

18. A device for determining from two or more different directions the geometrical patterns of a mark that is randomly shaped in three dimensions and embedded in a transparent material and fixed to an object comprising:

a matrix of radiation detectors;

at least a radiation source for emitting radiation to the matrix of radiation detectors;

means for placing the object with the mark in the path of the radiation so that a silhouette of the mark is projected onto the matrix of the radiation detectors by the radiation source and wherein the mark consists of randomly overlying fibers.

* * * * *